United States Patent [19]

Kyuma

[11] Patent Number: 5,563,656
[45] Date of Patent: Oct. 8, 1996

[54] IMAGE SENSING APPARATUS WITH WHITE BALANCE ADJUSTMENT

[75] Inventor: Kenji Kyuma, Kanagawa-ken, Japan

[73] Assignee: Canon Kabushiki Kaisha, Tokyo, Japan

[21] Appl. No.: 350,375

[22] Filed: Dec. 5, 1994

Related U.S. Application Data

[63] Continuation of Ser. No. 91,396, Jul. 13, 1993, abandoned, which is a continuation of Ser. No. 635,818, Jan. 2, 1991, abandoned, which is a continuation of Ser. No. 234,899, Aug. 22, 1988, abandoned.

[30] Foreign Application Priority Data

| Aug. 27, 1987 | [JP] | Japan | 62-211343 |
| Aug. 27, 1987 | [JP] | Japan | 62-211344 |
| Aug. 27, 1987 | [JP] | Japan | 62-211345 |
| Aug. 27, 1987 | [JP] | Japan | 62-211346 |
| Aug. 27, 1987 | [JP] | Japan | 62-211347 |

[51] Int. Cl.$^6$ .................................................. H04N 9/73
[52] U.S. Cl. ........................... 348/234; 348/222; 348/223
[58] Field of Search ....................... 348/222, 223, 348/228, 234, 255, 655, 663; 356/406, 416, 419, 425; 358/515, 516; H04N 9/07, 9/73, 9/04

[56] References Cited

U.S. PATENT DOCUMENTS

| 4,736,241 | 4/1988 | Murakami et al. | 358/29 |
| 4,739,393 | 4/1988 | Seki et al. | 358/29 |
| 4,750,032 | 6/1988 | Nakayama | 358/29 C |
| 4,797,733 | 1/1989 | Takagi et al. | 358/29 C |
| 4,883,360 | 11/1989 | Kawada et al. | 358/29 C |
| 4,931,856 | 6/1990 | Hieda et al. | 358/29 C |
| 5,170,247 | 12/1992 | Takagi et al. | 358/29 C |
| 5,177,599 | 1/1993 | Takagi et al. | 358/41 |
| 5,270,802 | 12/1993 | Takagi et al. | 348/223 |
| 5,272,521 | 12/1993 | Tatsumi | 348/223 |
| 5,282,024 | 1/1994 | Takei | 348/223 |
| 5,313,277 | 5/1994 | Suzuki | 348/223 |

FOREIGN PATENT DOCUMENTS 63-228893  9/1988  Japan.

OTHER PUBLICATIONS

White Balance Adjusting Device, U.S. Sn. 07/196,748, May 20, 1988.
White Balance Adjusting Device, U.S. Sn. 07/192,948, May 12, 1988.

*Primary Examiner*—Kim Yen Vu
*Attorney, Agent, or Firm*—Robin, Blecker, Daley & Driscoll

[57] ABSTRACT

An automatic white balance adjusting device in which white balance adjustment is performed by feedback controlling gains for color signals obtained from an image pickup element, comprising a first computing circuit for computing the color signals, a circuit for producing control signals for controlling the gains of the color signals on the basis of a signal output from the first computing circuit, a second computing circuit for computing the color signals in a different operation from that of the first computing circuit, and a circuit for correcting the control signals on the basis of a signal output from the second computing circuit.

29 Claims, 5 Drawing Sheets

FIG. 5

IMAGE SENSING APPARATUS WITH WHITE BALANCE ADJUSTMENT

This is a continuation application under 37 CFR 1.62 of prior application Ser. No. 08/091,396 filed Jul. 13, 1993 (aban.), which is a cont. 07/635,818 filed Jan. 2, 1991 (aban.) which is a cont. of 07/234,899 filed Aug. 22, 1988 (aban.)

BACKGROUND OF THE INVENTION

1. Field of the Invention

This invention relates to automatic white balance adjusting devices in image sensing apparatus such as video cameras or electronic still cameras.

2. Description of the Related Art

On the automatic white balance adjusting device for the video camera or the like, a wide variety of proposals are being made at present, including those using the color temperature sensor, or the video signal. Of these, a conventional example of the automatic white balance adjusting device using the video signal is described with reference to FIG. 1.

Figure 1:
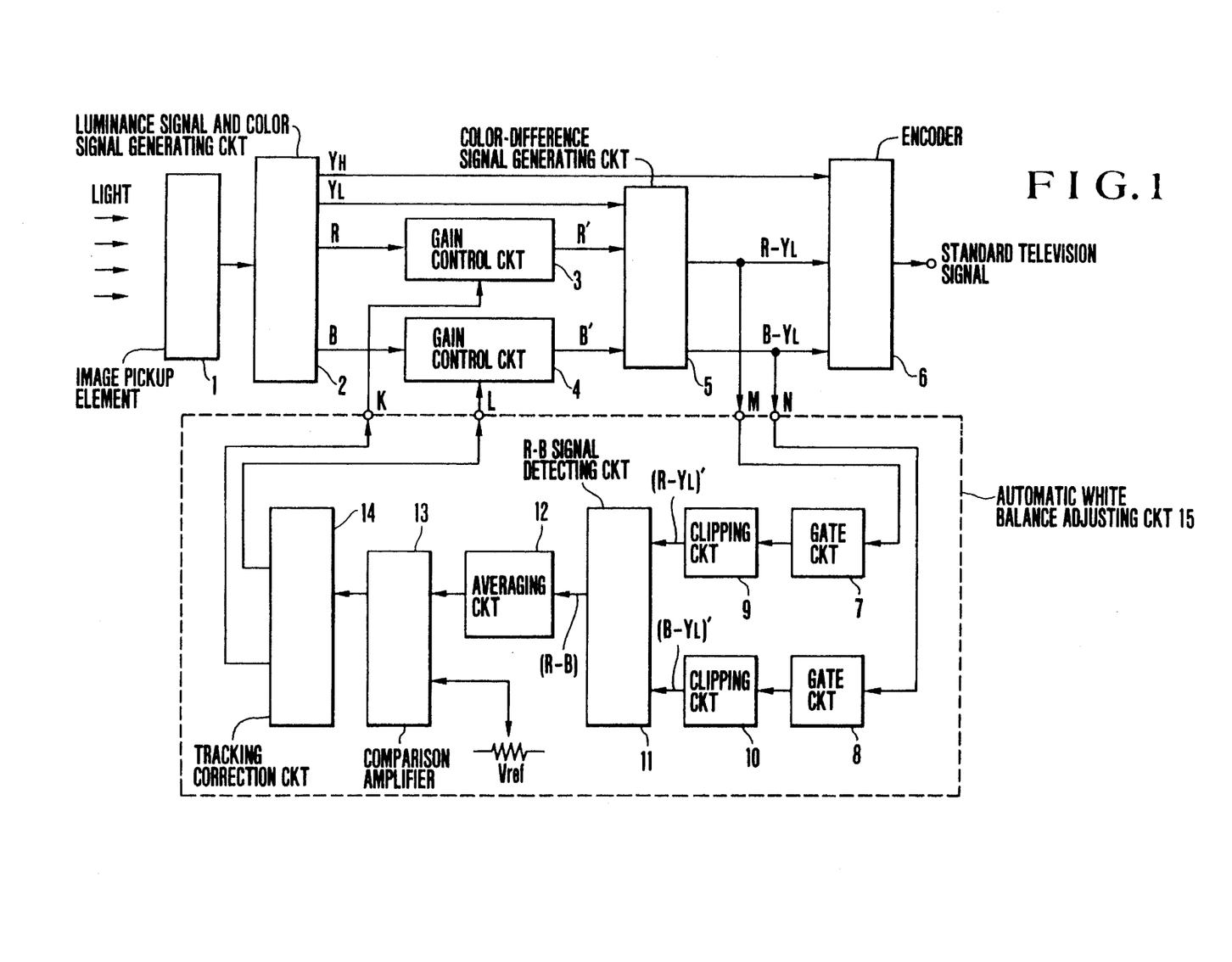
FIG. 1 is a block diagram roughly illustrating the conventional automatic white balance adjusting device using video signals.

FIG. 1 is a block diagram roughly illustrating the video signal dependent automatic white balance adjusting device which was reported at the national convention of the Television Society in Japan held in the year 1986. The device includes an image pickup element 1, a luminance signal and color signal generating circuit 2, gain control circuits 3 and 4, a color-difference signal generating circuit 5, an encoder 6, gate circuits 7 and 8, clipping circuits 9 and 10, an R-B signal detecting circuit 11, an averaging circuit 12, a comparison amplifier 13 and a tracking correction circuit 14. The gate circuits 7 and 8 through the tracking correction circuit 14 constitute an automatic white balance adjusting circuit 15. In the device of FIG. 1, a light signal entering the image pickup element 1 is photoelectrically converted to an electrical signal which is applied to the luminance signal and color signal generating circuit 2. In the aforesaid luminance signal and color signal generating circuit 2, a luminance signal $Y_H$ having a luminance signal band, another luminance signal $Y_L$ of color signal band, and a color signal R (Red) and another color signal B (Blue) are generated. The color signal R and the color signal B are applied respectively to the gain control circuits 3 and 4, in which they are amplified by a control signal from the tracking correction circuit 14, and from which they are produced as a color signal R' and a color signal B' respectively. These signals R' and B' are applied along with the aforesaid luminance signal $Y_L$ to the color-difference signal generating circuit 5 in which color-difference signals $(R-Y_L)$ and $(B-Y_L)$ are generated. The color-difference signals $(R-Y_L)$ and $(B-Y_L)$ are applied along with the luminance signal $Y_H$ to the encoder 6. From these inputs, a standard television signal is then generated to be output. Here, the above-described color-difference signals $(R-Y_L)$ and $(B-Y_L)$ are applied also to the automatic white balance adjusting circuit 15.

The color-difference signals $(R-Y_L)$ and $(B-Y_L)$ are applied to the gate circuits 7 and 8 respectively, wherein the unnecessary signal in the blanking period, the abnormal color-difference signal due to the signal collapse at the time of high brightness shooting, etc. are removed. Signals produced from the gate circuits 7 and 8 are applied to the clipping circuits 9 and 10 respectively, wherein any of the color-difference signals which exceed the level for an actually usable color temperature range is clipped, and supplied therefrom to the R-B signal detecting circuit 11, wherein a signal (R-B) is detected by taking difference between the outputs $(R-Y_L)'$ and $(B-Y_L)'$ from the clipping circuits 9 and 10. In the averaging circuit 12, the signal (R-B) from the R-B signal detecting circuit 11 is averaged, thus being converted to a D.C. signal. In the comparison amplifier 13, the signal from the averaging circuit 12 is compared with a reference voltage Vref. A corresponding signal to this comparison is output to the tracking correction circuit 14. In the tracking correction circuit 14, control signals for controlling the gains of the above-described gain control circuits 3 and 4 so as to correct the white balance are generated on the basis of the signal from the comparison amplifier 13. These control signals are output to the above-described gain control circuits 3 and 4. Since a negative-feedback loop is thus formed, the above-described white balance-adjusted color-difference signals can be supplied to the encoder 6.

With such a conventional device as described above, for the light of the sort which approximately comes under Planck's radiation law, such as the sun light or the light from a halogen lamp, when the object to be photographed is white, the values of the signals $(R-Y_L)$ and $(B-Y_L)$ both become zero. Hence, the condition in which the white balance is proper can be established. But, in the case of a light source such as fluorescent lamp, because its intensity distribution over spectrum is different from Planck's radiation law, while the value of the signal (R-B) becomes zero, the values of the signals $(R-Y_L)$ and $(B-Y_L)$ do not become zero, thus giving rise to a problem that the proper white balance cannot be established.

SUMMARY OF THE INVENTION

This invention has been made in order to eliminate such a problem and its object is to provide an automatic white balance adjusting device in which whether an illumination light source approximately comes under Planck's radiation law or not, the white balance can be properly adjusted.

To achieve the above-described object, in an embodiment of the invention, the automatic white balance adjusting device comprises first detecting means for detecting a first signal representing the difference between signal components of two color-difference signals $(R-Y_L)$ and $(B-Y_L)$ obtained from color signals, first comparing means for comparing the first signal output from the first detecting means with a first reference voltage adjusted to be equal to a D.C. voltage obtained when the first signal becomes zero, first changeover means, responsive to an output of the first comparing means, for selecting one of a second reference voltage and a third reference voltage which are preset depending on a positive or negative sign of the first signal, first averaging means for averaging an output of the first changeover means, a tracking correction circuit for producing outputs corresponding to an output of the first averaging means, second detecting means for detecting a second signal representing the sum of the signal components of the two color-difference signals, second comparing means for comparing the second signal output from the second detecting means with a fourth reference voltage adjusted to be equal to a D.C. voltage obtained when the second signal becomes zero, second changeover means, responsive to an output of the second comparing means, for selecting one of a fifth reference voltage and a sixth reference voltage which are preset depending on a positive or negative sign of the second signal, second averaging means for averaging an output of the second changeover means, and adding means for adding an output of the second averaging means and one of the outputs of the tracking correction circuit, wherein gains for the color signals are controlled by an output of the adding means and another of the outputs of the tracking correction circuit.

By having the above-described feature, regardless of whether or not an illumination light approximately comes under Planck's radiation law, a proper automatic white balance adjustment can be carried out.

Also, to achieve the above-described object, in another embodiment of the invention, the automatic white balance adjusting device comprises first computing means for computing color signals, means for producing control signals for controlling gains for the color signals on the basis of a signal output from the first computing means, second computing means for computing the color signals in a different operation from that of the first computing means, and means for correcting the control signals on the basis of a signal output from the second computing means.

Also, to eliminate such a conventional problem as described before, in still another embodiment of the invention, the automatic white balance adjusting device comprises first detecting means for detecting a first signal representing the difference between signal components of two color-difference signals obtained from color signals, first comparing means for comparing the first signal output from the first detecting means with a first reference voltage adjusted to be equal to a D.C. voltage obtained when the first signal becomes zero, first changeover means, responsive to an output of the first comparing means, for selecting one of a second reference voltage and a third reference voltage which are preset depending on a positive or negative sign of the first signal, first averaging means for averaging an output of the first changeover means, a first tracking correction circuit for producing an output for an R signal system and an output for a B signal system in response to an output of the first averaging means, second detecting means for detecting a second signal representing the sum of the signal components of the two color-difference signals, second comparing means for comparing the second signal output from the second detecting means with a fourth reference voltage adjusted to be equal to a D.C. voltage obtained when the second signal becomes zero, second changeover means, responsive to an output of the second comparing means, for selecting one of a fifth reference voltage and a sixth reference voltage which are preset depending on a positive or negative sign of the second signal, second averaging means for averaging an output of the second changeover means, a second tracking correction circuit for producing an output for the R signal system and an output for the B signal system in response to an output of the second averaging means, a first adder for adding the outputs for the R signal system among the outputs of the first and second tracking correction circuits, and a second adder for adding the outputs for the B signal system, wherein gains for the color signals are controlled by outputs of the first and second adders.

Also, to achieve the above-described object, in a further embodiment of the invention, the automatic white balance adjusting device comprises first detecting means for detecting a first signal representing the difference between signal components of color-difference signals obtained from color signals, first averaging means for averaging the first signal output from the first detecting means, first comparing means for comparing an average signal output from the first averaging means with a first reference voltage adjusted to be equal to a D.C. voltage obtained when the first signal becomes zero, a tracking correction circuit for producing outputs corresponding to an output of the first comparing means, second detecting means for detecting a second signal representing the sum of the signal components of the two color-difference signals, second averaging means for averaging the second signal output from the second detecting means, second comparing means for comparing an average signal output from the second averaging means with a second reference voltage adjusted to be equal to a D.C. voltage obtained when the second signal becomes zero, and adding means for adding an output of the second comparing means and one of the outputs of the tracking correction circuit, wherein a gain for one of the color signals is controlled by another of the outputs of the tracking correction circuit, and wherein a gain for another of the color signals is controlled by an output of the adding means.

Other objects and features and advantages of the invention will become apparent from the following description and drawings.

DETAILED DESCRIPTION OF THE PREFERRED EMBODIMENTS

Figure 2:
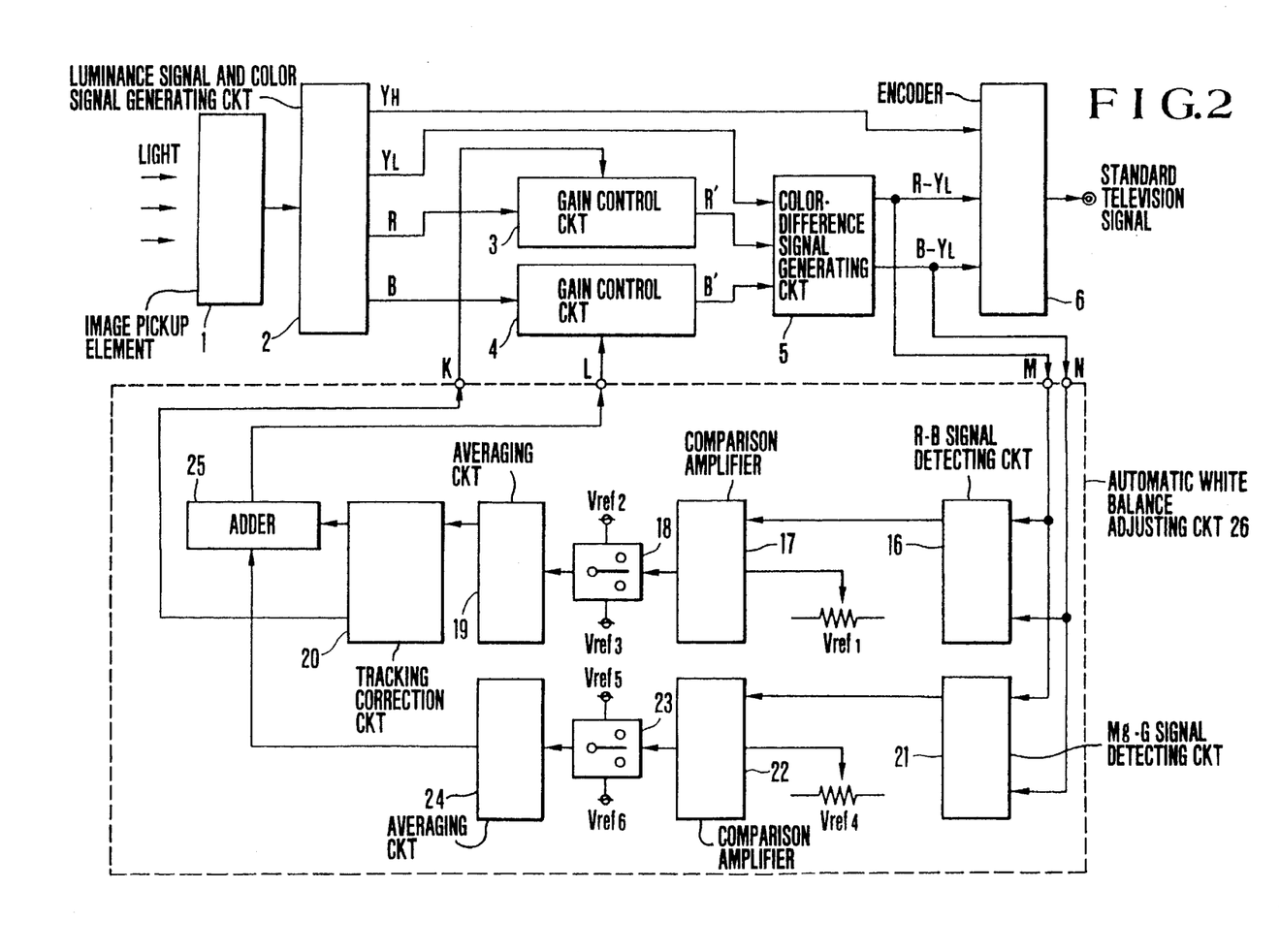
FIG. 2 is a block diagram illustrating the arrangement of the main parts of a first embodiment of an automatic white balance adjusting device according to the invention.

FIG. 2 is a block diagram illustrating the arrangement of the main parts of the automatic white balance adjusting device which is the first embodiment of the invention. In FIG. 2, terminals K, L, M and N correspond to those of the conventional device shown in FIG. 1. An automatic white balance adjusting circuit 26 in FIG. 2 corresponds to the above-described automatic white balance adjusting circuit 15 in FIG. 1. The other same or like parts as those shown in FIG. 1 are denoted by the same reference numerals.

In the device of FIG. 2, the color-difference signals $(R-Y_L)$ and $(B-Y_L)$ produced from the color-difference signal generating circuit 5 are output respectively through the terminals M and N to an R-B signal detecting circuit 16 and an Mg-G signal detecting circuit 21.

In the R-B signal detecting circuit 16, taking the difference between the color-difference signals $(R-Y_L)$ and $(B-Y_L)$, a signal (R-B) as the first signal is produced. A comparison amplifier 17 is a device for comparing the signal (R-B) with a first reference voltage Vref1. This voltage Vref1 is adjusted so as to be equal to a D.C. voltage obtained when the signal (R-B) becomes zero. Here, it is assumed in this embodiment that when R>B, the output of the comparison amplifier 17 becomes "H" level, and when R<B, it becomes "L" level. 18 is an changeover circuit which is a device for selectively outputting one of predetermined second and third reference voltages Vref2 and Vref3 when the output of the comparison amplifier 17 is "H" level or "L"

level, respectively. That is, when the output of the R-B signal detecting circuit 16 represents R>B, or when the color temperature of the illumination light is low, it outputs the second reference voltage Vref2. When representing R<B, it outputs the third reference voltage Vref3. An averaging circuit 19 is a device for averaging an output of the changeover circuit 18. The averaging circuit 19 takes a certain value in between the second reference voltage Vref2 and the third reference voltage Vref3; when the color temperature of the illumination light is low, it takes a nearer value to the second reference voltage Vref2; and as the color temperature increases, it becomes to take a nearer value to the third reference voltage Vref3. When the output of the averaging circuit 19 is near to the second reference voltage Vref2, or when the color temperature is low, a tracking correction circuit 20 produces a control signal for decreasing the gain for the gain control circuit 3 and another control signal for increasing the gain for the gain control circuit 4. Conversely when it is nearer to the third reference voltage Vref3, or when the color temperature is high, the tracking correction circuit 20 produces a control signal for increasing the gain of the gain control circuit 3 and another control signal for decreasing the gain of the gain control circuit 4. In this connection, it should be noted that these two control signals have a relationship that the white balance is properly adjusted in the actually usable color temperature range (for example, 2800° K.–8000° K.) for that light source which approximately comes under Planck's radiation law.

In the Mg-G signal detecting circuit 21 (Mg: Magenta; G: Green), taking the sum of the color-difference signals $(R-Y_L)$ and $(B-Y_L)$, a signal $(R+B-2Y_L)$ as the second signal is produced. A comparison amplifier 22 is a device for comparing the signal $(R+B-2Y_L)$ produced from the Mg-G signal detecting circuit 21 with a fourth reference voltage Vref4. This fourth reference voltage Vref4 is adjusted so as to be equal to a D.C. voltage obtained when the signal $(R+B-2Y_L)$ becomes zero. Here it is assumed in this embodiment that when $R+B>2Y_L$, the output of the comparison amplifier 22 becomes "H" level, and when $R+B<2Y_L$, it becomes "L" level. 23 is a changeover circuit for selectively outputting one of predetermined fifth and sixth reference voltages Vref5 and Vref6 when the output of the comparison amplifier 22 is "H" level or "L" level, respectively. That is, at this time, when the output of the Mg-G signal detecting circuit 21 represents $R+B>2Y_L$, the fifth reference voltage Vref5 is output. Also, when the illumination light approximately comes under Planck's radiation law, $R+B\approx 2Y_L$. Therefore, a near value to (Vref5+Vref6)/2 is output. An averaging circuit 24 is a device for averaging the output signal from the changeover circuit 23. The averaging circuit 24 takes a certain value in between the fifth and sixth reference voltages Vref5 and Vref6. This value varies depending on the degree of divergence of spectral radiations of the illumination light. In an adder 25, one of the control signals from the tracking correction circuit 20 and the output from the averaging circuit 24 are added. Here, when the illumination light is of the light source which approximately comes under Planck's radiation law, the output signal from the averaging circuit 24 is almost constant. At this time, the two control signals to be output to the gain control circuits 3 and 4 are set so as to become an optimum relation to the variation of the color temperature of the illumination light by the tracking correction circuit 20 and the adder 25. Also, when the output signal from the Mg-G signal detecting circuit 21 represents $R+B>2Y_L$, the output signal from the averaging circuit 24 has a nearer value to the reference voltage Vref5 than the output signal produced when the above-described illumination light is of the light source which approximately comes under Planck's radiation law. At this time, the output signal from the adder 25 has such a characteristic as to make smaller the gain of the gain control circuit 4 than the output signal produced when the above-described illumination light approximately comes under Planck's radiation law. Also, conversely when the output signal of the Mg-G signal detecting circuit 21 represents $R+B<2Y_L$, the adder 25 produces such a control signal as to make large the gain for the gain control circuit 4. In the gain control circuits 3 and 4, gain-controlled signals R' and B' according to the control signals from the tracking correction circuit 20 and the adder 25 are input to the color-difference signal generating circuit 5. In the color-difference signal generating circuit 5, color-difference signals $(R-Y_L)$ and $(B-Y_L)$ are formed by the signals R' and B' and the luminance signal $Y_L$ of the low band, and supplied to the encoder 6 and the automatic white balance adjusting circuit 26.

In such a manner, the color-difference signals whose white balance is adjusted mainly by the tracking correction circuit 20 in a case where the illumination light approximately comes under Planck's radiation law, or properly adjusted by the work of the tracking correction circuit 20 and the averaging circuit 24 in a case where the illumination light does not approximately come under Planck's radiation law, can be supplied to the encoder 6.

Also, in this embodiment, the width of the output signal from the averaging circuit 24 may be narrowed by a limiter to such an extent that when, for example, the fluorescent lamp (white color) issues the illumination light, the white balance is adjusted correctly, so that an automatic white balance adjusting device which is not very susceptible to the influence of the green of the leaves of trees in the picture, etc. can be realized.

Also, in this embodiment, the arrangement is such that the white balance is adjusted by controlling the gains for the color signals R and B. Yet, in other methods, for example, even by the arrangement that the low band luminance signal is added to, or subtracted from, the color signal at some rate, the white balance adjustment can be easily embodied.

Further, the color-difference signals may be supplied through the above-described gate circuits 7 and 8 and the clipping circuit 9 and 10 of the conventional example to the R-B signal detecting circuit 16 and the Mg-G signal detecting circuit 21.

Also, though, in this embodiment, for the control signal to be applied to the gain control circuit 4, the output signal from the tracking correction circuit 20 and the output signal from the averaging circuit 24 after having been added by the adder 25 have been used, it is of course good to use the gain control signal from the adder 25 not for the gain control circuit 4, but for the gain control circuit 3. ·

Also, though, in this embodiment, the two color signals (R-B) and $(R+B-2Y_L)$ have been produced by computing the two color-difference signals $(R-Y_L)$ and $(B-Y_L)$, the above-described two color signals may be different color signals from each other, both of which become zero in the case when $R-Y_L=0$ and $B-Y_L=0$ hold.

Figure 3:
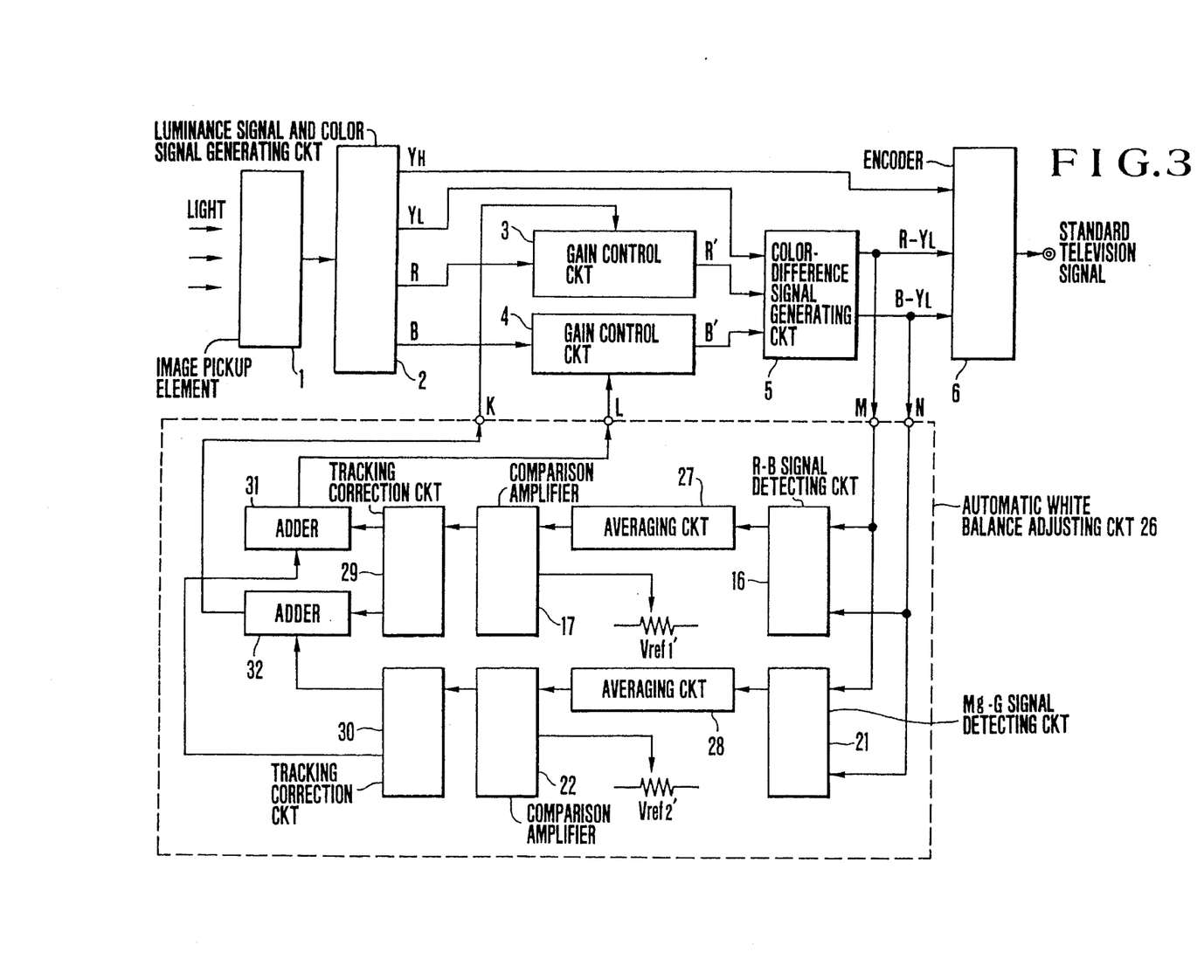
FIG. 3 is a block diagram roughly illustrating the arrangement of the parts of a second embodiment of the automatic white balance adjusting device according to the invention.

Next, FIG. 3 is a diagram illustrating a second embodiment of the invention, wherein the same reference numerals as those of FIG. 1 and FIG. 2 denote the same elements.

In the device of FIG. 3, after the above-described color-difference signals $(R-Y_L)$ and $(B-Y_L)$ produced by the color-difference signal generating circuit 5 have been applied through the terminals M, N to the R-B signal detecting circuit 16 and Mg-G signal detecting circuit 21, averaging circuits 27 and 28 average respectively the above-described output signals (R-B) and (R+B-2$Y_L$) from the R-B signal detecting circuit 16 and the Mg-G signal detecting circuit 21. In the comparison amplifier 17, the output signal from the averaging circuit 27 is compared with a first reference voltage Vref1', and the result is amplified and output. Here, the first reference voltage Vref1' is adjusted so as to be equal to a D.C. voltage obtained when the R-B signal becomes zero. In a first tracking correction circuit 29, when the output of the comparison amplifier 17 represents R>B, a control signal for making small the gain of the above-described gain control circuit 3 and another control signal for making large the gain of the above-described gain control circuit 4 are produced. Conversely when it represents R<B, the reverse operation, that is, a control signal for making large the gain of the gain control circuit 3 and another control signal for making small the gain of the gain control circuit 4 are produced. Further, the two control signals to be input to the terminals K and L have a relationship that the white balance is adjusted correctly in an actually usable color temperature range (for example, 2800° K.–8000° K.) for the light source which approximately comes under Planck's radiation law.

In the comparison amplifier 22, the result of comparison of the output signal from the averaging circuit 28 with a second reference voltage Vref2' is output. Here, the second reference voltage Vref2' is adjusted so as to be equal to a D.C. voltage obtained when the signal (R+B-2$Y_L$) becomes zero. In a second tracking correction circuit 30, when the output of the comparison amplifier 22 represents R+B>2$Y_L$, a control signal for making small the gain of the gain control circuit 3 and another control signal for making small the gain of the gain control circuit 4 are produced. Conversely when it represents R+B<2$Y_L$, the reverse operation to that described above, that is, a control signal for making large the gain of the gain control circuit 3 and another control signal for making large the gain of the gain control circuit 4 are produced. Also, in the case when the illumination light in the visible light region approximately comes under Planck's radiation law, R+B÷2$Y_L$ results. At this time, therefore, the two control signals take some predetermined values. When the illumination light does not approximately come under Planck's radiation law, for example, in the case of the fluorescent lamp, R+B≈2$Y_L$ results. Therefore, control signals other than the above-described predetermined values are output.

Adders 31 and 32 add the control signals from the first tracking correction circuit 29 and the control signals from the second tracking correction circuit 30 respectively to each signal of the R signal system, B signal system, and output them to the gain control circuits 3 and 4. In the gain control circuits 3 and 4, the gains for the above-described R signal and B signal are controlled by the control signals from the adders 31 and 32.

In the color-difference signal generating circuit 5, the above-described color-difference signals (R-$Y_L$) and (B-$Y_L$) are produced on the basis of the R' signal, B' signal from the gain control circuits 3 and 4.

As a result of the above, even under a light source which does not approximately come under Planck's radiation law, the color-difference signals (R-$Y_L$) and (B-$Y_L$) of which the white balance has been automatically adjusted are supplied to the encoder 6.

It should be noted that before the detecting circuits 16 and 21 of the above-described automatic white balance adjusting circuit 26, the above-described gate circuits 7 and 8 and the clipping circuits 9 and 10 of the automatic white balance adjusting circuit 15 may be added as shown in FIG. 1.

Figure 4:
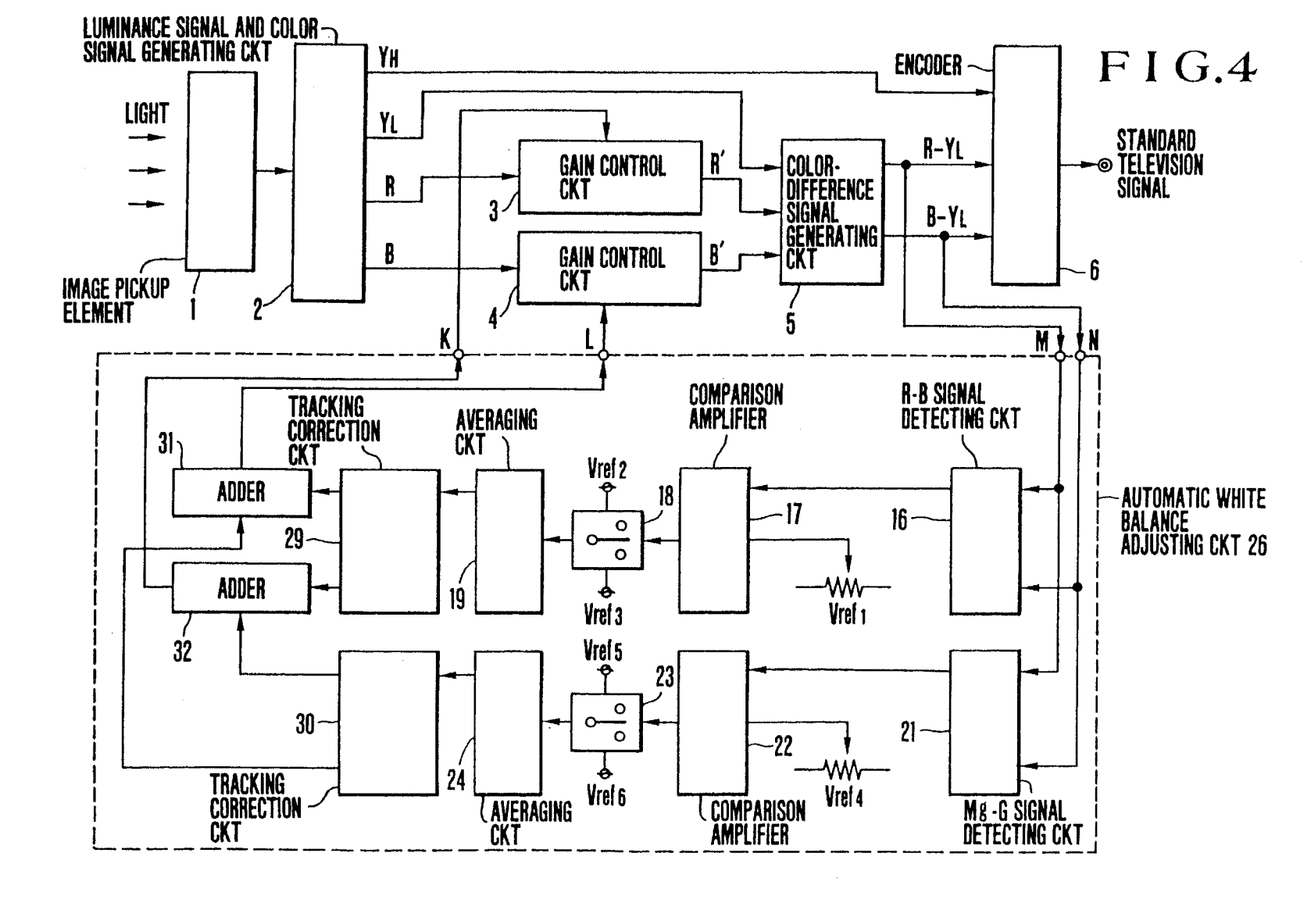
FIG. 4 is a block diagram illustrating the arrangement of the main parts of a third embodiment of the automatic white balance adjusting device according to the invention.

FIG. 4 is a block diagram roughly illustrating the arrangement of the parts of a third embodiment of the automatic white balance adjusting device according to the invention. In FIG. 4, the same reference numerals as those of FIGS. 1–3 are employed to denote the same elements.

In the device of FIG. 4, the tracking correction circuit 29, when the output of the above-described averaging circuit 19 is near the reference voltage Vref2, or the color temperature is low, produces a control signal for making small the gain of the above-described gain control circuit 3 and another control signal for making large the gain of the above-described gain control circuit 4. Conversely when it is near the reference voltage Vref3, or the color temperature is high, a control signal for making large the gain of the gain control circuit 3 and another control signal for making small the gain of the gain control circuit 4 are produced.

In this connection, it should be noted that these two control signals have a relationship that the white balance is adjusted correctly in the actually usable color temperature range (for example, 2800° K.–8000° K.) for a light source which approximately comes under Planck's radiation law.

Also, the tracking correction circuit 30, when the output of the averaging circuit 24 is near the reference voltage Vref5, produces a control signal for making small the gain of the gain control circuit 3 and another control signal for making small the gain of the gain control circuit 4. Conversely when it is near the reference voltage Vref5, a control signal for making large the gain of the gain control circuit 3 and another control signal for making large the gain of the gain control circuit 4 are produced. The adders 31 and 32 add the control signals from the tracking correction circuits 29 and 30 to each signal of the R signal system and the B signal system, and output the results to the gain control circuits 3 and 4. At this time, as has been described above, in the case when the illumination light approximately comes under Planck's radiation law, the tracking correction circuit 30 produces almost constant control signals, while the tracking correction circuit 29 produces control signals depending on the color temperature of the illumination light. In the adders 31 and 32, these control signals are added in such an addition ratio that the white balance can be adjusted correctly. In the gain control circuits 3 and 4, the gains for the color signals are controlled by the control signals from the adders 31 and 32. The outputs of the gain control circuits 3 and 4 are applied to the color-difference signal generating circuit 5. By such an arrangement, this embodiment forms a negative-feedback loop as a whole. Therefore, the color-difference signals (R-$Y_L$) and (B-$Y_L$) of which the white balance has been adjusted correctly can be supplied to the encoder 6.

Figure 5:
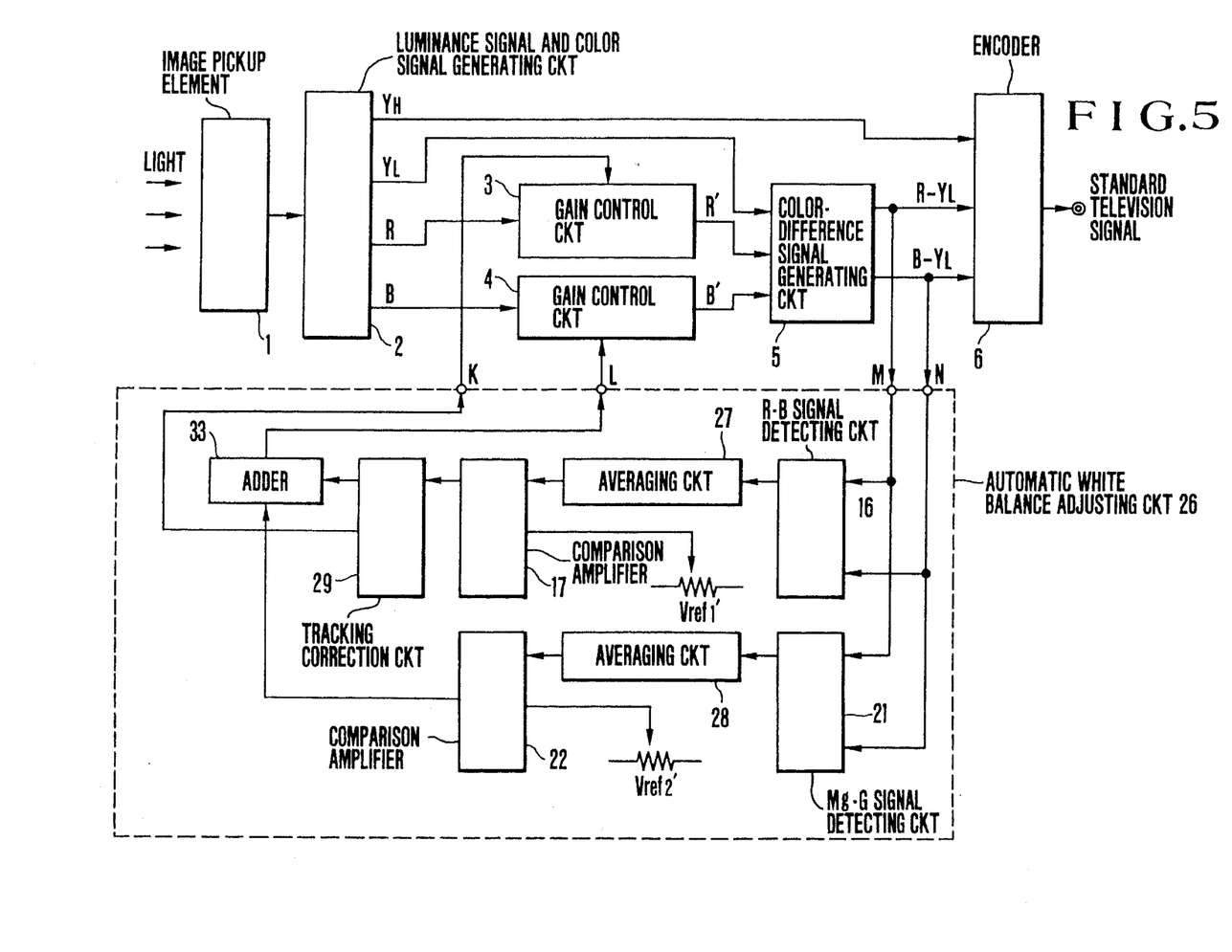
FIG. 5 is a block diagram illustrating the arrangement of the main parts of a fourth embodiment of the automatic white balance adjusting device according to the invention.

FIG. 5 is a diagram illustrating a fourth embodiment of the invention, wherein the same reference numerals as those of FIGS. 1–4 are employed to denote the same elements. In this figure, the above-described color-difference signals (R-$Y_L$) and (B-$Y_L$) produced by the color-difference signal generating circuit 5 are output through the terminals M and N to the R-B signal detecting circuit 16 and the Mg-G signal detecting circuit 21.

In the R-B signal detecting circuit 16, taking the difference between the color-difference signals (R-$Y_L$) and (B-$Y_L$), a signal (R-B) as the first signal is produced. Also, in the Mg-G signal detecting circuit 21, taking the sum of the color-difference signals (R-$Y_L$) and (B-$Y_L$), a signal (R+B-2$Y_L$) as the second signal is produced. In the averaging circuits, 27 and 28, the output signals (R-B) and (R+B-2$Y_L$) respectively from the R-B signal detecting circuit 16 and the Mg-G signal detecting circuit 21 are averaged respectively. In the comparison amplifier 17 the output signal from the averaging circuit 27 is compared with the first reference voltage Vref1', and the result is amplified and output. Here, the first reference voltage Vref1' is adjusted so as to be equal to a D.C. voltage obtained when the signal (R-B) becomes zero. In the tracking correction circuit 29, when the output of the comparison amplifier 17 represents R>B, a control signal for making small the gain of the above-described gain control circuit 3 is produced. Conversely when it represents R<B, the operation is reverse to the above and a control signal for making large the gain of the gain control circuit 3 is produced.

In the comparison amplifier 22, the result of comparison of the output signal from the averaging circuit 28 with the second reference voltage Vref2' is output. Here, the second reference voltage Vref2' is adjusted so as to be equal to a D.C. voltage obtained when the signal (R+B-2$Y_L$) becomes zero.

Here, in the case when the illumination light approximately comes under Planck's radiation law, R+B≈2$Y_L$ results. Therefore, the output signal of the comparison amplifier 22 is at a certain constant signal level. But when R+B>2$Y_L$, the output signal from the comparison amplifier 22 is a control signal for making small the gain of the gain control circuit 4. When R+B<2$Y_L$, the comparison amplifier 22 produces a control signal for, conversely, making large the gain of the gain control circuit 4. An adder 33 is a device for adding one of the output signals from the tracking correction circuit 29 to the output signal from the comparison amplifier 22. Here when the illumination light is of the light source which approximately comes under Planck's radiation law, the output signal from the comparison amplifier 22 is almost constant as has been described above. At this time, the two control signals to be output to the gain control circuits 3 and 4 are set by the tracking correction circuit 29 and the adder 33 so as to become an optimum relationship to the variation of the color temperature of the illumination light. Also, when the output signal of the Mg-G signal detecting circuit 21 represents R+B>2$Y_L$ or R+B<2$Y_L$, the output signal from the averaging circuit 28 is a different signal from the output signal obtained when the illumination light approximately comes under Planck's radiation law. At this time, the output of the adder 33 has such a characteristic as that which has been described above, when R+B>2$Y_L$, the gain of the gain control circuit 4 is made smaller, while when R+B<2$Y_L$, the gain of the gain control circuit 4 is made larger. And, the gain control circuits 3 and 4 control the gains of the color signals R and B according to the control signals from the tracking correction circuit 29 and the adder 33 and supplies the gain-controlled color signals R' and B' to the above-described color-difference signal generating circuit 5. The color-difference signal generating circuit 5 forms color-difference signals (R-$Y_L$) and (B-$Y_L$) by using the above-described signals R' and B' and the low band luminance signal $Y_L$, and supplies those to the above-described encoder 6 and the above-described automatic white balance adjusting circuit 26.

In such a manner, the color-difference signals of which the white balance has properly been adjusted mainly by the tracking correction circuit 29 in a case where the illumination light approximately comes under Planck's radiation law, or by the work of the tracking correction circuit 29 and the comparison amplifier 22 in a case where the illumination light does not approximately come under Planck's radiation law, can be supplied to the encoder 6. Also, in this embodiment, the width of the output signal from the averaging circuit 28 may be made narrowed to such an extent that when, for example, the fluorescent lamp (white color) issues the illumination light, the white balance is adjusted just correctly, so that an automatic white balance adjusting device which is not very susceptible to the influence of the leaves of trees in the picture can be realized.

Also, though, in each of the above-described embodiments, the arrangement that the white balance is adjusted by controlling the gains for the R signal and B signal has been shown, even these embodiments are easily applicable to other publicly known arrangements, for example, the one in which the white balance is adjusted by adding or subtracting the low band luminance signal to or from the color-difference signals (R-$Y_L$) and (B-$Y_L$).

What is claimed is:

1. An image sensing apparatus comprising:
   (a) image pickup means for forming a plurality of color signals from an optical image;
   (b) balance adjusting means for adjusting the balance between said plurality of color signals;
   (c) control means for controlling said balance adjusting means in accordance with the result of a computation between said plurality of color signals which are balance-adjusted by said balance adjusting means;
   (d) discrimination means for discriminating a dominant color among colors of an object on the basis of said plurality of color signals which are balance-adjusted by said balance adjusting means; and
   (e) correcting means for varying a control state of said control means depending on the discrimination result of said discrimination means.

2. An automatic white balance adjusting device for color signals obtained from an image pickup element, comprising:
   first detecting means for detecting a first signal representing the difference between signal components of two color-difference signals obtained from said color signals;
   first averaging means for averaging said first signal output from said first detecting means;
   first comparing means for comparing an average signal output from said first averaging means with a first reference voltage adjusted to be equal to a D.C. voltage obtained when said first signal becomes zero;
   a first tracking correction circuit for producing outputs corresponding to an output of said first comparing means;
   second detecting means for detecting a second signal representing the sum of the signal components of said two color-difference signals;
   second averaging means for averaging said second signal output from said second detecting means;
   second comparing means for comparing an average signal output from said second averaging means with a second reference voltage adjusted to be equal to a D.C. voltage obtained when said first signal becomes zero;
   a second tracking correction circuit for producing outputs corresponding to an output of said second comparing means;
   a first adder for adding outputs for an R signal system among the outputs of said first and said second tracking correction circuits;
   a second adder for adding outputs for a B signal system; and
   gain control means for respectively controlling gains of the color signals by using outputs of said first and said second adders.

3. An automatic white balance adjusting device for color signals obtained from an image pickup element, comprising:

first detecting means for detecting a first signal representing the difference between signal components of two color-difference signals obtained from said color signals;

first comparing means for comparing said first signal output from said first detecting means with a first reference voltage adjusted to be equal to a D.C. voltage obtained when said first signal becomes zero;

first changeover means, responsive to an output of said first comparing means, for selecting one of a second reference voltage and a third reference voltage which are preset depending on a positive or negative sign of said first signal;

first averaging means for averaging an output of said first changeover means;

a tracking correction circuit for producing an output corresponding to an output of said first averaging means;

a second detecting means for detecting a second signal representing the sum of the signal components of said two color-difference signals;

second comparing means for comparing said second signal output from said second detecting means with a fourth reference voltage adjusted to be equal to a D.C. voltage obtained when said second signal becomes zero;

second changeover means, responsive to an output of said second comparing means, for selecting one of a fifth reference voltage and a sixth reference voltage which are preset depending on a positive or negative sign of said second signal; second averaging means for averaging an output of said second changeover means;

adding means for adding an output of said second averaging means to the output of said tracking correction circuit; and gain control means for controlling gains of said color signals by using an output of said adding means.

4. An automatic white balance adjusting device for color signals obtained from an image pickup element, comprising:

first detecting means for detecting a first signal representing the difference between signal components of two color-difference signals obtained from said color signals;

first comparing means for comparing said first signal output from said first detecting means with a first reference voltage adjusted to be equal to a D.C. voltage obtained when said first signal becomes zero;

first changeover means, responsive to an output of said first comparing means, for selecting one of a second reference voltage and a third reference voltage which are preset depending on a positive or negative sign of said first signal;

first averaging means for averaging an output of said first changeover means;

a first tracking correction circuit for producing an output of an R signal system and an output of a B signal system in response to an output of said first averaging means;

second detecting means for detecting a second signal representing the sum of the signal components of said two color-difference signals;

second comparing means for comparing said second signal output form said second detecting means with a fourth reference voltage adjusted to be equal to a D.C. voltage obtained when said second signal becomes zero;

second changeover means, responsive to an output of said second comparing means, for selecting one of a fifth reference voltage and a sixth reference voltage which are preset depending on a positive or negative sign of said second signal;

second averaging means for averaging means of said second changeover means;

a second tracking correction circuit for producing an output for the R signal system and an output for the B signal system in response to an output of said second averaging means;

a first adder for adding the outputs for the R signal system of said first and said second tracking correction circuits;

a second adder for adding the outputs for the B signal system; and gain control means for controlling gains of said color signals by using outputs of said first and said second adders.

5. An automatic white balance adjusting device for color signals obtained from an image pickup element, comprising:

first detecting means for detecting a first signal representing the difference between signal components of two color-difference signals obtained from said color signals;

first averaging means for averaging said first signal output from said first detecting means;

first comparing means for comparing an average signal output from said first averaging means with a first reference voltage adjusted to be equal to a D.C. voltage obtained when said first signal becomes zero;

a tracking correction circuit for producing outputs corresponding to an output of said first comparing means;

second detecting means for detecting a second signal representing the sum of the signal components of said two color-difference signals;

second averaging means for averaging said second signal output from said second detecting means;

second comparing means for comparing an average signal output from said second averaging means with a second reference voltage adjusted to be equal to a D.C. voltage obtained when said second signal becomes zero;

adding means for adding an output of said second comparing means and one of the outputs of said tracking correction circuit; and gain control means for controlling a gain for one of said color signals by using another of the outputs of said tracking correction circuit, and for controlling a gain of another of said color signal by using an output of said adding means.

6. An image sensing apparatus comprising:

(a) image pickup means for forming a plurality of color signals from an optical image;

(b) balance adjusting means for adjusting the balance between said plurality of color signals;

(c) control means for controlling said balance adjusting means in accordance with the result of a computation between said plurality of color signals which are balance-adjusted by said balance adjusting means;

(d) discrimination means for discriminating whether or not a combination of said plurality of color signals which are balance-adjusted by said balance adjusting means corresponds to a spectral radiance which comes under Planck's radiation law; and (e) varying means for varying a control state of said control means depending on the discrimination result of said discrimination means.

7. An apparatus according to claim 6, wherein said balance adjusting means is a variable gain amplifier.

8. An apparatus according to claim 6, wherein said control means computes said plurality of color signals output from said image pickup means to obtain a signal (R-B), and controls said balance adjusting means in accordance with the signal (R-B).

9. An apparatus according to claim 6 or 8, wherein said correcting means computes said plurality of color signals output from said image pickup means to obtain a signal (Mg-G), and corrects said control means in accordance with the signal (Mg-G).

10. An automatic white balance adjusting device comprising:

(a) image pickup means for obtaining a plurality of primary color signals and a luminance signal;

(b) first color difference signal forming means for forming a first color difference signal between first and second primary color signals;

(c) second color difference signal forming means for forming a second color difference signal representing a difference between a magenta and a luminance component signal corresponding to said luminance signal;

(d) means for controlling the gains for said plurality of primary color signals on the basis of the first and second color difference signals; and (e) averaging means for averaging said first and second color difference signals, respectively.

11. A device according to claim 10, further including comparing means for comparing said first and second color difference signals, as averaged by said averaging means, with a predetermined reference signal, respectively.

12. A device according to claim 10, wherein said first and second primary color signals are red and blue signals, respectively.

13. A device according to claim 10, wherein said luminance component signal includes a green signal.

14. An automatic white balance adjusting device comprising:

(a) image pickup means for obtaining a plurality of primary color signals and a luminance signal;

(b) first color difference signal forming means for forming a first color difference signal between first and second primary color signals;

(c) second color difference signal forming means for forming a second color difference signal representing a difference between a magenta and a luminance component signal corresponding to said luminance signal;

(d) means for controlling the gains for said plurality of primary color signals on the basis of the first and second color difference signals; and (e) comparing means for comparing said first and second color difference signals with a predetermined reference signal, respectively.

15. A device according to claim 14, further including averaging means for averaging the first and second color difference signals following such comparison thereof respectively with said predetermined reference signal.

16. A device according to claim 14, wherein said first and second primary color signals are red and blue signals, respectively.

17. A device according to claim 14, wherein said luminance component signal includes a green signal.

18. An automatic white balance adjusting device for a plurality of color signals obtained from an image pickup element, comprising:

first computing means for computing said plurality of color signals to form a signal (R-B);

producing means for producing a control signal for adjusting a white balance of said plurality of color signals on the basis of the signal (R-B) output from said first computing means;

second computing means for computing said plurality of color signals to form a signal (Mg-G);

modifying means for modifying said control signal on the basis of the signal (Mg-G) output from said second computing means;

adjusting means for adjusting a white balance of the plurality of color signals on the basis of the control signal modified by said modifying means; and averaging means for averaging said signals (R-B) and (Mg-G), respectively.

19. A device according to claim 18, further including comparing means for comparing said signals (R-B) and (Mg-G), as averaged by said averaging means, with a predetermined reference signal, respectively.

20. An automatic white balance adjusting device for a plurality of color signals obtained from an image pickup element, comprising:

first computing means for computing said plurality of color signals to form a signal (R-B);

producing means for producing a control signal for adjusting a white balance of said plurality of color signals on the basis of the signal (R-B) output from said first computing means;

second computing means for computing said plurality of color signals to form a signal (Mg-G);

modifying means for modifying said control signal on the basis of the signal (Mg-G) output from said second computing means;

adjusting means for adjusting a white balance of the plurality of color signals on the basis of the control signal modified by said modifying means; and comparing means for comparing said signals (R-B) and (Mg-G) with a predetermined reference signal, respectively.

21. A device according to claim 20, further including averaging means for averaging said signals (R-B) and (Mg-G) following such comparison thereof respectively with said predetermined reference signal.

22. An image sensing apparatus, comprising:

(a) image pickup means for forming a plurality of color signals from an optical image;

(b) gain adjusting means for adjusting gains for the plurality of color signals respectively;

(c) first extracting means for extracting an R-B signal from the plurality of color signals gain-adjusted by said gain adjusting means;

(d) second extracting means for extracting another color difference signal different from the R-B signal from the plurality of color signals gain-adjusted by said gain-adjusting means;

(e) control means for producing gain control signals to control the gain adjusting means by using both of the R-B signal and said another color difference signal; and (f) averaging means for averaging the R-B signal and said another color difference signal, respectively.

23. An apparatus according to claim 22, further including comparing means for comparing the R-B signal and said another color difference signal, as averaged by said averaging means.

24. An image sensing apparatus, comprising:
   (a) image pickup means for forming a plurality of color signals from an optical image;
   (b) gain adjusting means for adjusting gains for the plurality of color signals respectively;
   (c) first extracting means for extracting an R-B signal from the plurality of color signals gain-adjusted by said gain adjusting means;
   (d) second extracting means for extracting another color difference signal different from the R-B signal from the plurality of color signals gain-adjusted by said gain-adjusting means;
   (e) control means for producing gain control signals to control the gain adjusting means by using both of the R-B signal and said another color difference signal; and
   (f) comparing means for comparing the R-B signal and said another color difference signal with a predetermined reference signal, respectively.

25. An apparatus according to claim 24, further including averaging means for averaging the R-B signal and said another color difference signal following such comparison thereof respectively with said predetermined reference signal.

26. An image sensing apparatus, comprising:
   (a) image pickup means for forming a video signal from an optical image;
   (b) white balance adjusting means for adjusting the white balance of the video signal;
   (c) extracting means for extracting an R-B signal and another color difference signal from the video signal processed through said white balance adjusting means, said another color difference signal being different from the R-B signal;
   (d) control means for controlling the white balance adjusting means by using the R-B signal and said another color difference signal; and
   (e) averaging means for averaging the R-B signal and said another color difference signal, respectively.

27. An apparatus according to claim 26, further including comparing means for comparing the R-B signal and said another color difference signal, as averaged by said averaging means.

28. An image sensing apparatus, comprising:
   (a) image pickup means for forming a video signal from an optical image;
   (b) white balance adjusting means for adjusting the white balance of the video signal;
   (c) extracting means for extracting an R-B signal and another color difference signal from the video signal processed through said white balance adjusting means, said another color difference signal being different from the R-B signal;
   (d) control means for controlling the white balance adjusting means by using the R-B signal and said another color difference signal; and
   (e) comparing means for comparing the R-B signal and said another color difference signal with a predetermined reference signal, respectively.

29. An apparatus according to claim 28, further including averaging means for averaging the R-B signal and said another color difference signal following such comparison thereof respectively with said predetermined reference signal.

* * * * *